No. 630,414. Patented Aug. 8, 1899.
S. SCHWARTZ.
COOKING VESSEL.
(Application filed Dec. 21, 1898.)
(No Model.)
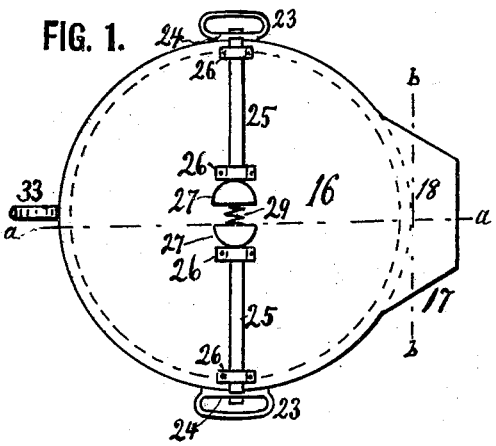
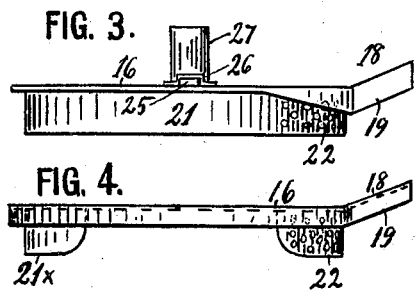
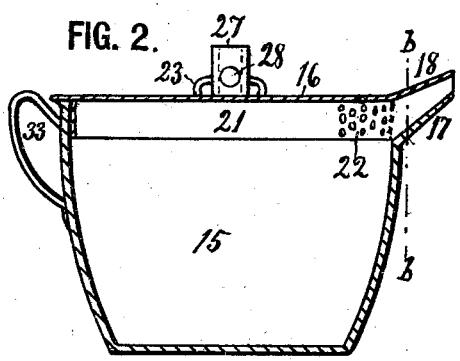
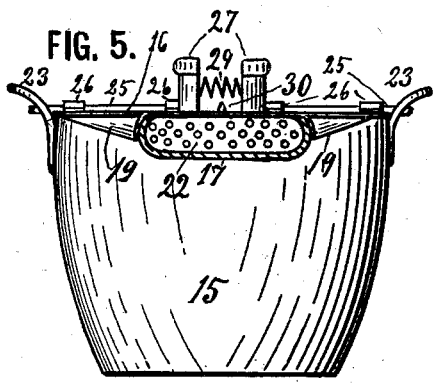
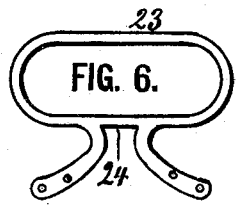
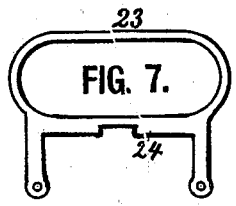
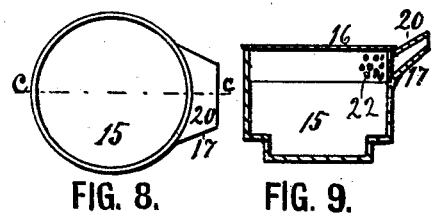
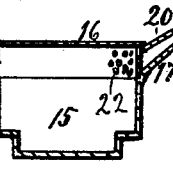
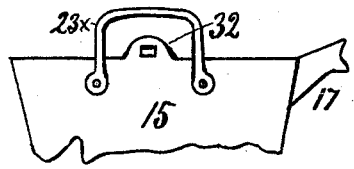
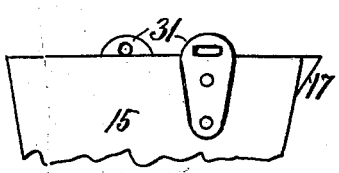
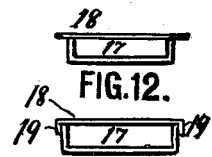
WITNESSES:
D. E. Carlsen.
Nels Rustad.
INVENTOR:
Sophia Schwartz.
BY her ATTORNEY:
A. M. Carlsen.
THE NORRIS PETERS CO., PHOTO-LITHO., WASHINGTON, D. C.

UNITED STATES PATENT OFFICE.

SOPHIA SCHWARTZ, OF CHAMPION, MICHIGAN.

COOKING VESSEL.

SPECIFICATION forming part of Letters Patent No. 630,414, dated August 8, 1899.

Application filed December 21, 1898. Serial No. 699,974. (No model.)

*To all whom it may concern:*

Be it known that I, SOPHIA SCHWARTZ, a citizen of the United States, residing at Champion, in the county of Marquette and State of Michigan, have invented certain new and useful Improvements in Cooking Vessels; and I do declare the following to be a full, clear, and exact description of the invention, such as will enable others skilled in the art to which it appertains to make and use the same, reference being had to the accompanying drawing, and to the figures of reference marked thereon, which form a part of this specification.

My invention relates to improvements in cooking vessels; and the objects of my invention are, first, to provide a cooking vessel with an easily-securable cover; second, to provide a cooking vessel from which the water may be poured out quickly and without danger of scalding the hands by the steam when the water is hot; third, to provide a cooking vessel or like utensil with a rotary cover, the turning of which will admit more or less steam to escape and the water to be strained out from the vessel, according as the cover may be turned. These and other minor objects I attain by the novel construction and arrangement of parts illustrated in the accompanying drawings, in which—

Figure 1 is a top view of a cooking vessel with my improvements applied to it. Fig. 2 is a vertical sectional view on the line $a\ a$ in Fig. 1. Fig. 3 is a side view of the cover of the vessel. Fig. 4 is a side view of the cover in a modified form. Fig. 5 is a front elevation of said cooking vessel, with the spout in section, on the line $b\ b$ in Figs. 1 and 2. Figs. 6 and 7 are enlarged detail views of the side handles of the vessel. Fig. 8 is a top view of the vessel only, with a modified shape of its spout. Fig. 9 is a vertical sectional view on the line $c\ c$ in Fig. 8. Figs. 10 and 11 are side views of the upper portion of cooking vessels of old constructions and with modified means for holding the cover on the vessel. Figs. 12, 13, and 14 are front end views of the spout made in various modified shapes.

Referring to the various parts in the drawings by reference-numerals, 15 is the cooking vessel proper, and 16 is the cover for same. The cover may be applied to any cooking vessel having a spout, either as 17 in Fig. 10 or Fig. 11 or any other suitable shape; but in the new cooking vessels which I make in connection with my improved cover the spout is made very wide, as in Figs. 1, 2, 5, and 8 shown and also in Fig. 12, where the spout is open at the top and covered by the projection 18 of the cover 16. In Figs. 3 and 13 the said projection 18 is formed with the steam-guards 19, while in Figs. 8, 9, and 14 the spout is formed with its own cover or roof 20. When the spout is thus made, the cover may be made perfectly round and need not have the projection 18. This style will do for large vessels; but the opening at the top is better, because it facilitates the cleaning of the inside of the spout. The sides of the spout may, however, be curved inward at the top, as shown in Fig. 5, to help prevent escape of the steam sidewise.

The cover 16 is provided at its under side with a dependent rim 21, projecting down into the vessel as far as the base of the spout. A portion of this rim sufficiently large to cover the opening of the spout adjacent to the rim is perforated, as at 22, and when the spout-cover 18 is used the same is formed on the cover 16 above the perforations 22, so that when the latter admit the water to be poured out through the spout the spout-cover 18 prevents the steam from escaping up and back over the cover 16.

Upon opposite sides of the vessel I secure the wide handholds or handles 23, which near the edge of the vessel are provided with the cross-bars 24, under which take hold the outer ends of the two locking bolts or slides 25, which slide in the keepers 26, secured upon the cover. The adjacent ends of these slides are provided with upwardly-projecting finger-holds 27, between which are inserted in the cavities 28 (see Fig. 2) the ends of the coil-spring 29, which hold the slides normally spread or pushed out over the edges of the cover.

30 is a stop in the center of the cover to terminate the retraction of the slides.

The finger-holds 27 are preferably made of wood and are of semicylindrical form, so that when they are brought together they form a round knob or button, by which the cover may readily be lifted and handled.

When the cover is applied to old or ordinary cooking vessels, handles like those shown in Fig. 6 or Fig. 7 may be riveted onto them, or if the vessel has a bail it is only necessary to remove the bail and let the catches on the cover take hold in the apertures formerly occupied by the bail and to secure handles like 23× upon the sides of the vessel, or if the bail-ears are not of the shape 32 in Fig. 10, so that this can be done, then special ears like 31 may be secured upon the vessel, as in Fig. 11, and any suitable make of handles may be used. Such and other similar modifications may be made according to the manufacturer's option and taste and the materials used without diverging from the spirit and scope of my invention.

33 is a handhold fixed upon the rear side or opposite the spout of the vessel.

In the modification Fig. 4 the steam-guard 19 is extended all around the edge or top of the vessel. In said view is also shown how the rim under the cover may be partly cut away, leaving only the perforated portion 22 and the opposite solid portion 21×. The latter act would simply lighten the rim a trifle and save that much material, but is not claimed as an improvement on my main invention or a special modification thereof.

In using the vessel the cover must, if made as in Fig. 4, be turned with the solid guard 21× toward the spout; but if made as in Fig. 3, or round, as in Fig. 9, or with the flat spout-cover in Fig. 12 it may be turned in any position which will bring the perforations away from the spout or leave only a few of them in communication with the spout as a vent for the steam not wanted for the cooking. When the food is cooked and it is desired to pour the water off from it, the cover is grasped by the catches or knobs 27, so that they close together and allow the slides 25 to slip with their outer ends into locking contact with the cross-bars 24 of the handles or ears, as the case may be. The vessel is then tilted forward by taking hold of its two side handles 23 or by one of them and the handle 33 at the rear edge of the vessel until all the water is poured out. The cover is then removed and the food is taken out, preferably by tilting the vessel forward. In the last-named process the wide flat-bottomed spout serves as an excellent guide, gathering and delivering the food in good shape upon the platters.

It is obvious that this cover may be used not only on vessels of the shapes shown in my drawings, but also on coffee-pots, teapots, and many other utensils, for regulating and controlling the escape of steam and flavor during cooking.

Having thus described my invention, what I claim, and desire to secure by Letters Patent, is—

1. The combination with a cooking vessel having a spout, of a cover having a dependent rim covering the inner opening of the spout, a portion of said rim being perforated and another portion being imperforate; said spout being open at the top, and said cover having a projection covering the open top of the spout when the perforated portion meets the spout, substantially as described.

2. The combination with a cooking vessel, having a spout, of a cover having a rim depending from it and covering the inner opening of the spout; a portion of said rim being perforated and another portion imperforate, said spout being open at its upper side and said cover having a projection covering the open top of the spout when the perforations in the rim register with the spout, and the steam-guard 19, coming down at the sides of the spout and extending back therefrom outside the vessel, substantially as and for the purpose set forth.

3. The combination with a cooking vessel, having a spout open at its upper side, of a cover for the vessel, the same having a dependent rim covering the inner opening of the spout, and a projection covering the open top side of the spout; said rim having a perforated portion directly below the said projection on the cover, and means for securing the cover to the vessel when the said projection of the cover is over the spout and the perforations in the rim register with the spout, substantially as set forth.

4. The combination with a cooking vessel, of a pair of handles secured at the sides thereof and having the cross-bars 24, the cover 16, having the opposite, sliding catches 25, adapted to engage under the said cross-bars, the buttons 27 at the adjacent ends of the slides, the spring 29, interposed between said buttons, and means for limiting the retraction of the slides, substantially as shown and described.

In testimony whereof I affix my signature in presence of two witnesses.

SOPHIA SCHWARTZ.

Witnesses:
A. M. CARLSEN,
J. P. ALLEN.